United States Patent [19]
Barody et al.

[11] Patent Number: 6,000,454
[45] Date of Patent: Dec. 14, 1999

[54] DRUM FOR TIRE ASSEMBLY

[75] Inventors: Didier Barody, Cournon-D'Auvergne; René Falvard, Manzat; Francois Molinero, Chauriat, all of France

[73] Assignee: Compagnie Generale des Etablissements Michelin-Michelin & CIE, France

[21] Appl. No.: 08/569,337

[22] Filed: Dec. 8, 1995

[30] Foreign Application Priority Data

Dec. 19, 1994 [FR] France ................................ 94 15378

[51] Int. Cl.⁶ .................................................. B29D 30/24
[52] U.S. Cl. ........................ 156/415; 156/416; 156/420
[58] Field of Search .................................. 156/415, 417, 156/420, 414, 416, 419, 418

[56] References Cited

U.S. PATENT DOCUMENTS

| | | |
|---|---|---|
| 3,674,604 | 7/1972 | Gazuit . |
| 3,778,326 | 12/1973 | Gazuit . |
| 3,822,165 | 7/1974 | Habert ...................................... 156/416 |
| 4,131,500 | 12/1978 | Wilde et al. ............................. 156/417 |

FOREIGN PATENT DOCUMENTS

| | | |
|---|---|---|
| 1492577 | 8/1967 | France . |
| 1779278 | 2/1972 | Germany . |
| 904531 | 8/1962 | United Kingdom . |

OTHER PUBLICATIONS

Rapport De Recherche Preliminaire.

*Primary Examiner*—Geoffrey L. Knable
*Attorney, Agent, or Firm*—Alan A. Csontos; Robert R. Reed

[57] ABSTRACT

A drum is provided for building of a tire. The drum includes a central shaft supporting two plates mounted axially and sliding thereon and a plurality of rods are articulably mounted on each plate. The rods of each plate are covered by a sleeve and a membrane is connected to each of the sleeves. A mantle covers the assembly to provide a surface on which the tire is progressively constructed. A process for assembling a tire with the drum is also disclosed.

23 Claims, 9 Drawing Sheets

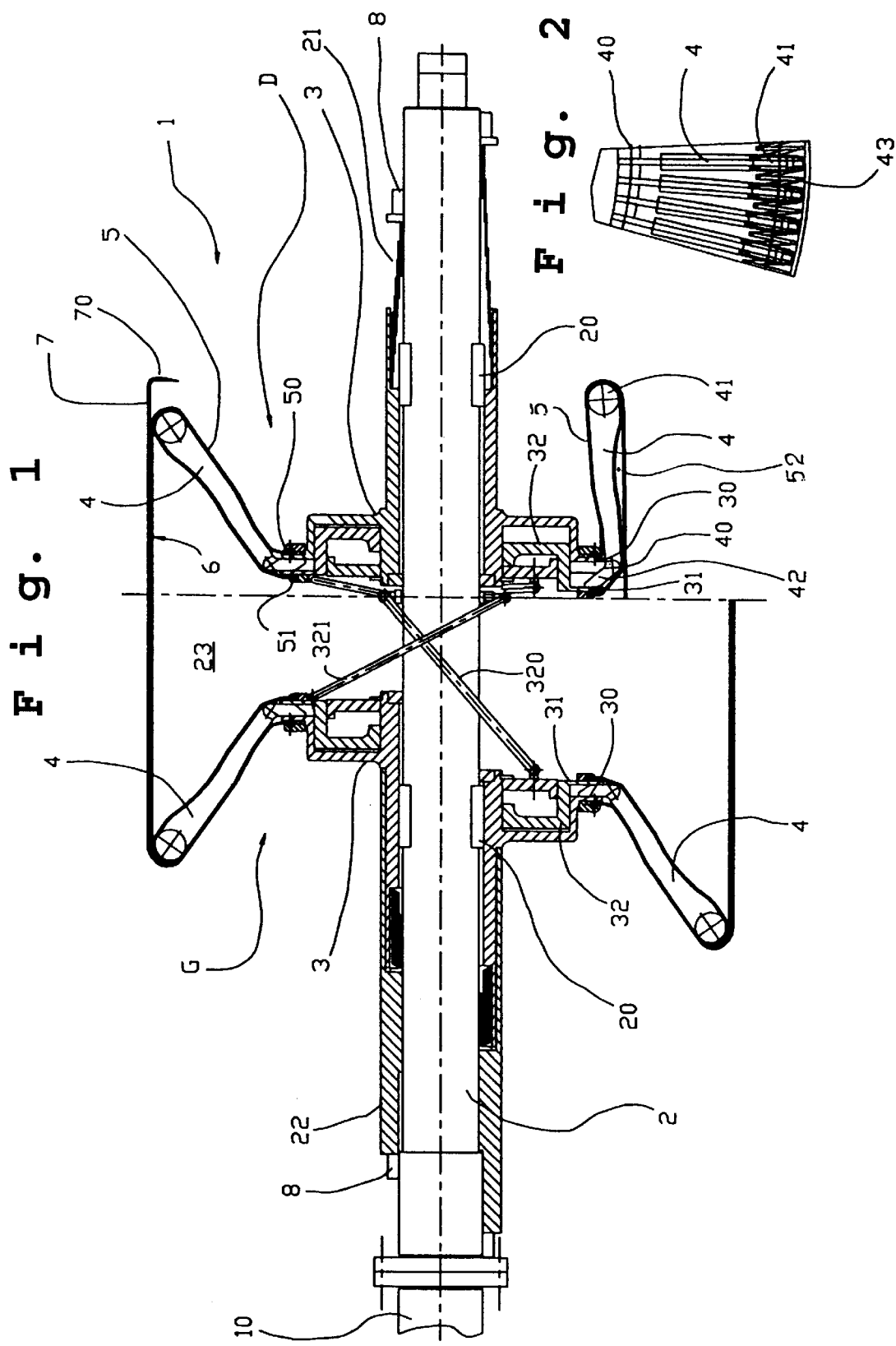

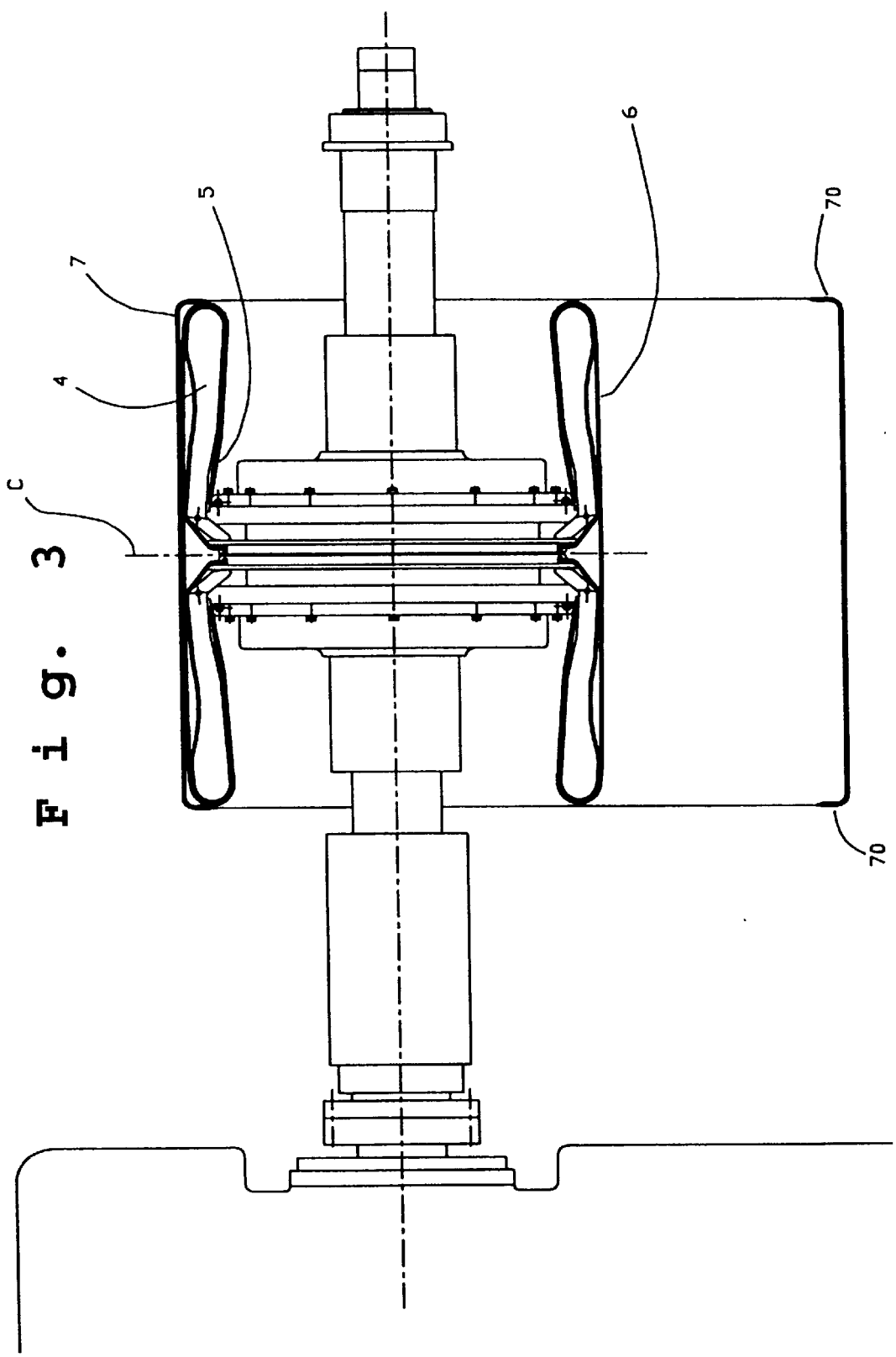

DRUM FOR TIRE ASSEMBLY

BACKGROUND OF THE INVENTION

The present invention relates to a drum for fabrication of tires and a process for using such a drum to assemble a tire. The state of the art knows of a considerable number of different types of such drums, from the most simple to the most complex. Some of these have been specially developed for only one part of the building of a green tire: one therefore speaks of first stage drums or second stage drums. Other drums are designed to handle a green tire during the entire period of its building (drum for building in one phase).

The present invention is aimed particularly at drums with shoulders, that is, drums designed to build the beads of the tires on the lateral edges of the drum, and not on the radially upper surface of the drum.

Among these drums, one knows namely holders comprising several parts assembled upon each other, on which a green tire is built, and which are then demounted from the interior of the tire after building. However, such holders can only be used for a single size of tire, and moreover their assembly and especially their disassembly can prove to be complex, even difficult in applications where this disassembly is done manually.

U.S. Pat. No. 3,778,326 gives an example of a more automated drum. This drum can take a spread-out position in which it defines a holder for manufacturing of a tire carcass and a retracted position allowing removal of the carcass after manufacturing. Even if this patent indicates that it is possible to adjust the drum for different widths of tires to be produced, in practice, these possibilities of adjustment are extremely limited. Also, the shoulder of the drum provides a sufficiently continuous and rigid support only for one value of axial distance. In fact, the radial upper bend of the rods can be aligned with the end of the crosspieces only for one and only one relative distance for the sleeves holding the rods. Here again, such a drum must be considered as lending itself only to the manufacturing of a single tire size.

Patent FR 1 492 577 describes a drum whose design is particularly associated with realizing a rigid support with good continuity on the shoulder. However, the walls of such a drum, because they are only comprised of one pneumatic surface, do not provide a sufficiently precise reference for confection of a tire.

SUMMARY OF THE INVENTION

The present invention aims at proposing a drum which is as simple as possible, whose necessary movements for all of the building operations can both be executed without difficulty manually, or can be automated very easily.

Another objective of the present invention concerns proposing a drum on which a large number of different sizes of tires can be produced, by only requiring simple adjustments to be executed and by only requiring a minimum of change of accessories to change from one size of tire to another.

Another objective of the invention is to propose such a drum which offers a sufficiently firm and continuous holder on which the beads of a tire can be formed with great accuracy. More precisely, the objective of the intention is to propose a drum on which a bead of rather large height can be manufactured, in an orientation close to the final orientation of the vulcanized tire, in order to avoid that the bead filler undergoes folding and deformations during shapings which are inherent to the manufacturing of the tire on a drum.

According to the present invention, the drum for tire building having a central shaft which can be mounted on a mandrel holder, is comprised of:

two plates which can slide axially on the central shaft relative to each other;

on each plate, a group of rods each having on one side an axis of articulation and on the other side a head, said rods being mounted on each plate in such a way that the said axes of articulation are all included in the same plane perpendicular to the axis of the central shaft, and equidistant from the latter;

means for controlling the pivoting of the said rods around their axis of articulation, between a retracted position and a building position, said building position of the rods in each of the plates being symmetrical from one plate to the other;

a sleeve covering all of the rods of each group, anchored to each plate in such a way as to define, for each of the groups, an airtight enclosure, and the means allowing to put the said enclosure in depression.

In a preferred mode for realizing the invention, a reinforced removable mantle is used to obtain an approximately cylindrical and sufficiently firm surface to serve as the reference surface on which the various products comprising the tire are laid.

In this latter case, the invention also proposes a process for manufacturing of a green tire, which includes the following steps:

providing the following initial configuration for the drum: the rods in retracted position, the plates brought close together axially;

placing the mantle on the drum, such that it covers all of the rods of each plate;

establishing the building position of the rods;

separating the plates axially relative to each other up to a predetermined building distance;

building the said green tire by placing the desired components in the appropriate location on the said mantle;

bringing the said plates close together axially;

establishing the retracted position of the rods and removing the green tire from the drum;

extracting the said removable mantle from the interior of the said green tire and recovering it for the next building.

The invention will be perfectly understood through consultation of the following description, illustrating through the attached figures and in a non-restrictive way, two methods of realization of a drum according to the invention, allowing for using all of the advantages which can be expected.

BRIEF DESCRIPTION OF THE DRAWINGS

FIG. 1 is a radial cross-section showing a drum in four different configurations;

FIG. 2 illustrates a detail of the drum;

FIGS. 3 to 8 illustrate six successive phases of the movements of the drum; and

DETAILED DESCRIPTION OF THE PREFERRED EMBODIMENT

Figure 4:
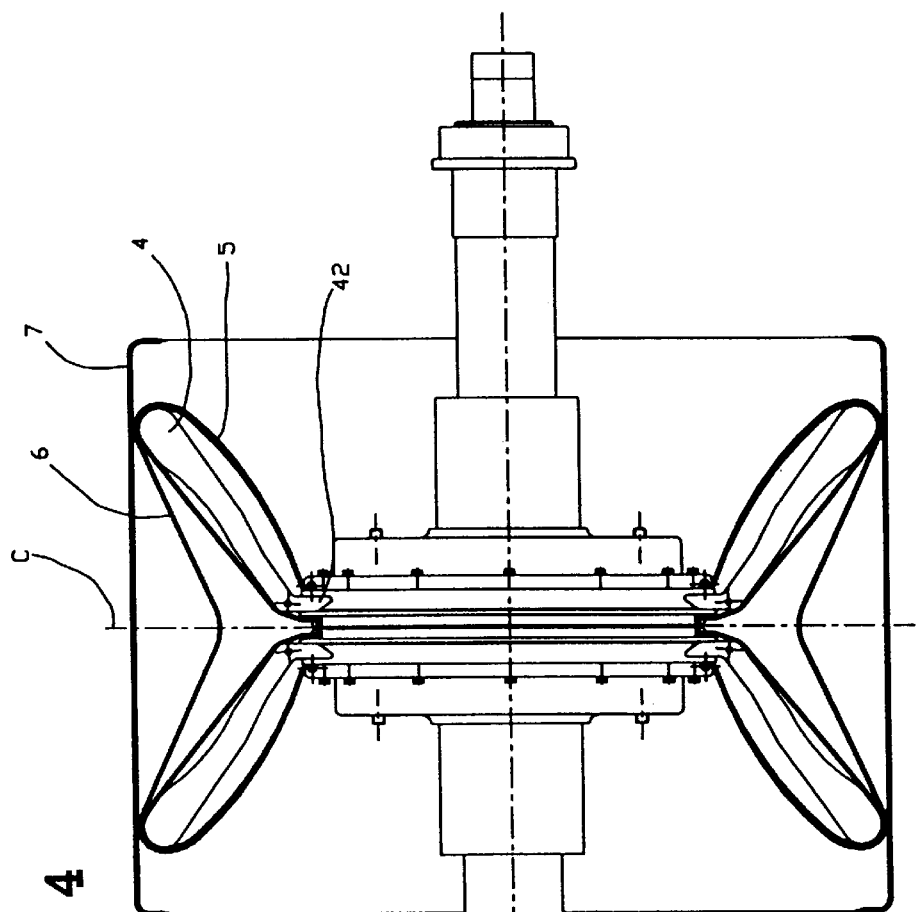
Figure 5:
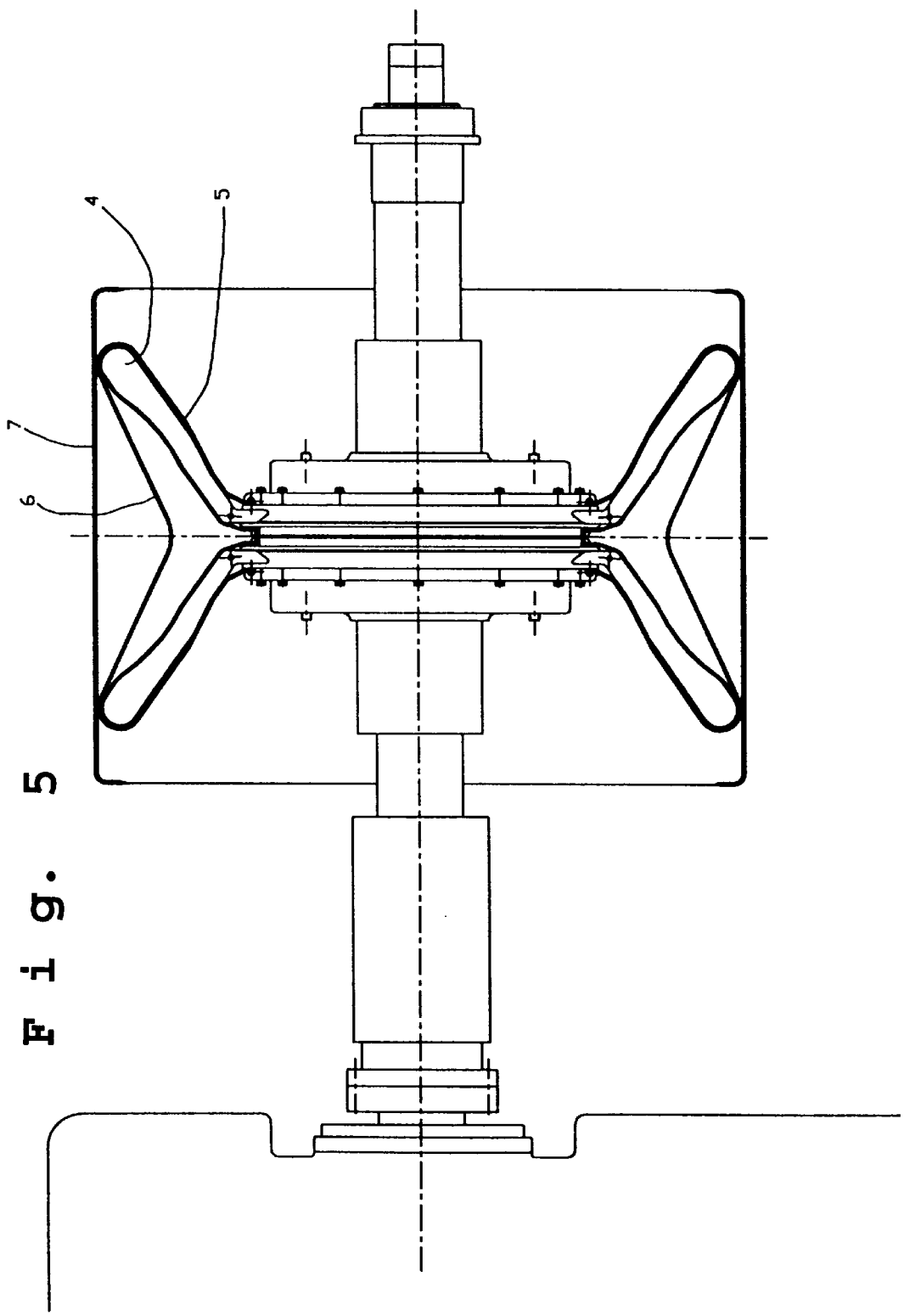

As seen in FIGS. 1–8, in one preferred embodiment of the present invention, a drum 1 comprises a central shaft 2 designed to be mounted on a support 10 capable of supporting it in an overhanging position, all the while imparting to it the necessary movements, and providing the necessary fluids for its operation, through appropriate pneumatic controls and conduits (not shown) incorporated inside the central shaft 2. The drum 1 is composed of two approximately symmetrical sub-assemblies G and D, held by two plates 3. Each of the plates 3 can freely slide axially on the central shaft 2, and is immobilized from rotation relative to the latter owing to locking keys 20.

Each plate 3 supports a group of rods 4 (as an idea, about 40 to 100 rods per plate 3) articulated on the plate. The rods 4 each includes an axis of articulation 40 on one side and a head 41 on the other. Each rod 4 also includes a lever 42 extending it beyond the axis of articulation 40 on the side opposite the head 41. All the rods 4 are mounted on each plate 3 in a manner to be all positioned in the same way within a group, each describing a movement in the radial plane which includes it. Their axes of articulation 40 are positioned equidistant from the shaft 1, that is, on the same circle to which they are tangent. All the levers 42 are inserted in the space between two crowns 30, 31, on each of the plates 3. Crown 30 is fixed directly to plate 3, while crown 31 is mounted on a piston 32 concentric with the shaft 2. The pistons 32 are controlled by a fluid conveyed by the conduit 320.

A spring 43 is mounted on all the heads 41 of the rods of each of the assemblies G and D (see FIG. 2). Spring 43 is a spiral annular spring, with joined spirals at rest. It contains a number of spirals which is an exact multiple of the number of rods 4 of a G or D assembly respectively. Preferably, it contains between two and four times as many spirals as rods 4. This permits providing good continuity of the circumferential edge section defined by all of the heads 41, for any radial position of the latter. Each head 41 is inserted in a spiral of the spring 43, at locations regularly spaced along the length of the spring 43, thus the necessity that the number of spirals be a multiple of the number of rods 4. We will also note that the spring 43 also has the function of providing a return of the rods 4 toward the position shown in the lower right quadrant of FIG. 1.

Furthermore, each group of rods 4 is enclosed in a sleeve 5 (see also FIG. 3) composed of two heels 50, 51 for its assembly respectively on each of the two crowns 30, 31. A pneumatic conduit 321 allows for a vacuum to be created on the inside of each sleeve 5. Owing to that, the sleeve 5 is flattened against the rods 4. Thus, each group provides a relatively firm and continuous surface, on which the bead of the tire can be built with accuracy.

In an initial variation of the described preferred embodiment of the present invention, the drum contains means for establishing airtightness between the rods of each of the plates and a pneumatic conduit capable of conveying compressed air axially between the said plates for effecting axial separation of the plates relative to each other when an airtight item covers the two groups of rods in an airtight manner. To realize this airtightness, a membrane 6 is for example joined to each of the two sleeves 5 near their middle, that is, at the location where the sleeve surrounds the heads 41 of the rods 4. Finally, the shaft is equipped with an orifice emerging into the central part (not shown), allowing for inflation and deflation of an interior chamber 23, delimited by the assemblies G and D, with airtightness being provided by the sleeves 5 and the membrane 6.

The membrane 6 and the sleeves 5 are realized for example in homogeneous, non reinforced rubber, and are impervious to air, as well as the liaison of the membrane 6 on the sleeves 5. Preferably, the manufacturing is done on a cylinder of the diameter of the heels 50, 51, such that they can increase in diameter only when stretched by an increase in inflation pressure.

The drum contains a basically cylindrical mantle 7, flanked by two lateral flanges 70 oriented radially, curved toward the inside. The mantle 7 is removable. It is designed to form a ring covering the membrane 6. The mantle 7 is composed of a rubbery material reinforced by wires positioned at zero degrees, or at an angle very close to zero degrees, for example spirally, in such a way that they stop the circumferential expansion of the said mantle at a predetermined value.

This mantle 7 serves as the reference of building for the tires to be produced. It is an accessory of the drum. As one will understand from what follows, the same mantle can be suitable for several sizes of tires to be produced, at least within a range of distances between beads, that is, within a range of curvilinear length of the carcass from one bead to the other.

It is the mantle 7 which imposes the diameter of the reference surface for assembly of the tire. This is the reason for which it is designed so as to impose on the drum a maximum given development, by cooperating with the other elements of the drum as will be explained below. The mantle 7 is produced on a form giving it the appearance which it has in the upper right quadrant of FIG. 1. It contains reinforcement wires, positioned at zero degrees only in the cylindrical part, and either at zero degrees or at crossed angles in the flanges 70. The mantle 7 is for example produced on a cylindrical form having shoulders with the diameter set at the required value and is reinforced by unstretchable wires at zero degrees. The reinforcement of the flanges 70 should generally be sufficient for them not to be able to pass above the heads 41, under the effect of the tension from the mantle 7 in the axial direction.

The membrane 6 and/or the mantle 7 are designed in a manner to be able to slide easily relative to each other, at least in the axial direction. For example, the surfaces concerned are treated to be anti-sticky, or at least one of them is covered with a bi-elastic fabric like "Milliken D022" fabric. This type of fabric is not considered as reinforcing the membrane 6. Also, it is preferably advisable that there are, on facing surfaces of membrane 6 and mantle 7, some grooves (not shown) or some other means of equivalent effect, allowing for the air to be released to avoid formation of an air pocket between membrane 6 and mantle 7 during operation of the drum. The exterior surface of the mantle 7 can also be covered with some bi-elastic fabric, so that the uncured rubber products placed during confection of a tire do not adhere to said mantle. As a variation, the mantle 7 could provide airtightness between the groups of rods 4, in place of the membrane 6.

Finally, among the main parts of the drum, one also finds two screws 8 for adjustment of the maximum axial distance of the plates 3 relative to each other. These screws 8 constitute a stop which limits the axial movement of the plates 3. These screws 8 are adjusted manually and the screws 8 preferably contain a pressure screw for preventing them from rotating. In a variation, these screws 8 can be electrically controlled for example by a system of nuts and bolts with reverse threads.

A protective sleeve 21 covers the central shaft 2 on either side of each plate 3 and axially on the exterior of the latter. This sleeve avoids clogging of the shaft 2, which would interfere with the proper sliding of the plates 3 on the latter. A brace 22 positioned between the adjustment screw 8 and the plate 3 on the left side of the drum. Other construction details will appear better in light of the description of the operation of the drum which will follow.

The drum illustrating the invention in the present specification is designed particularly in view of utilization for manufacture of large tires with bias carcass. It can possibly be used on a small range of different seat diameters: this amounts to positioning the bead of the tire at different heights on the wall of the drum (on FIG. 8 see the bead T drawn in a solid line or the bead T1 drawn in a dotted line).

Attention is directed next to the adjustment of the drum. For a given tire, the confection distance between beads is adjusted by adjusting the maximum distance between plates 3. To this end, each of the adjustment screws 8 is brought to the appropriate position, then this position is locked. The stop which controls the distance between plates 3 is thus adjusted.

For operation of the drum in accordance with the process of assembling a tire of the present invention, returning particularly FIGS. 3 to 8. They show, in the order of confection, the successive appearances which the drum takes. At the beginning, in the absence of any pressure, or if need be, depression in the sleeves 5, in the chamber limited by the membrane 6, and in each of the pistons 32, by the elastic return of the spring 43, the rods 4 take a retracted position, in which they are parallel to the axis of the central shaft 2, and the plates 3 back onto each other.

In passing, note that the exact axial position on the shaft 2, of all of the parts supported by the plates 3, is immaterial, of course within certain limits imposed by the position of the adjustment screws 8, and without each plate being able to cross the center of the shaft, marked by line C on FIG. 3. Note that the configuration of such a drum cannot always be symmetrical during changes of configuration, particularly since no positive mechanical device comes to monitor the axial position of each of the plates 3 on the central shaft 2. On the other hand, during manufacture of a tire, the drum is always in a strictly controlled configuration, through contact of the plates 3 on the stops and through positive monitoring of the slant of the rods 4.

Attention returns now to utilization of the drum. Beginning by placing the mantle 7 on the drum 1 itself, such that the lateral flanges 70 overlap the drum on both sides of the two groups of rods 4. Under the effect of gravity, the mantle remains suspended on the drum (FIG. 3). Using the appropriate pneumatic control, the pistons 32 are activated to raise the rods 4 (FIG. 4). Next, a vacuum is created inside the sleeves 5 (FIG. 5), which allows for having a production surface of precise form on the walls of the drum.

Figure 6:
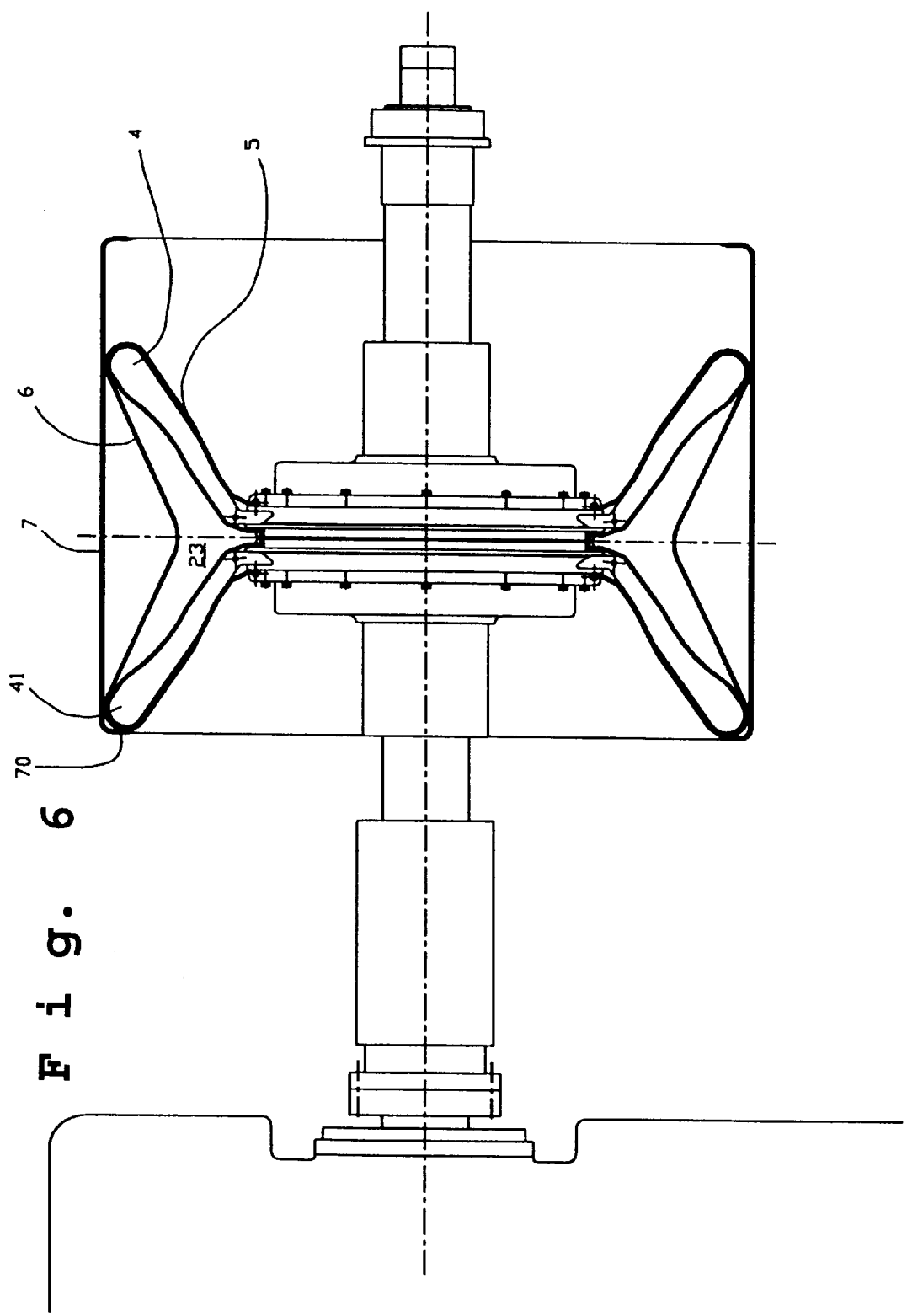
Figure 7:
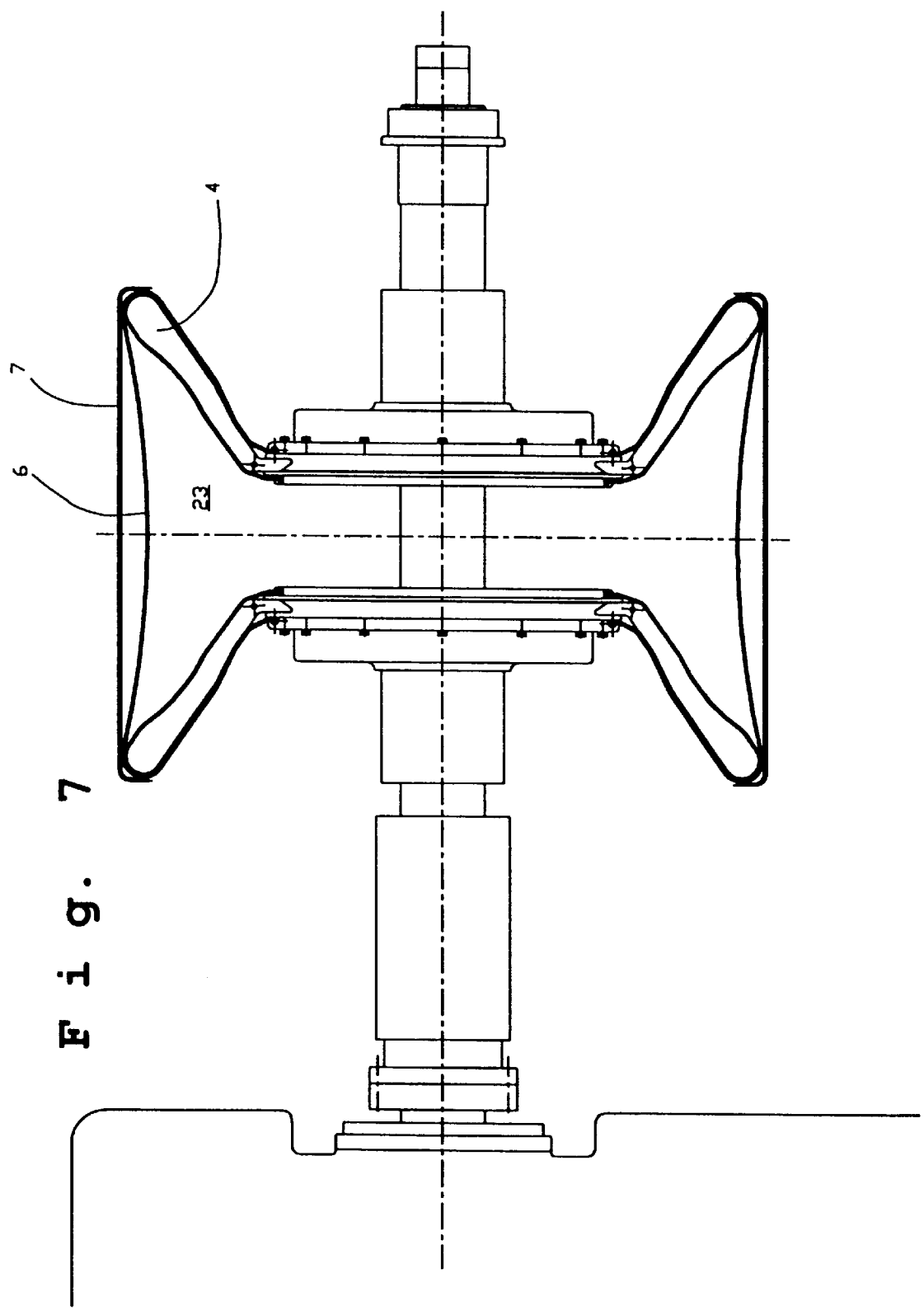
Figure 8:
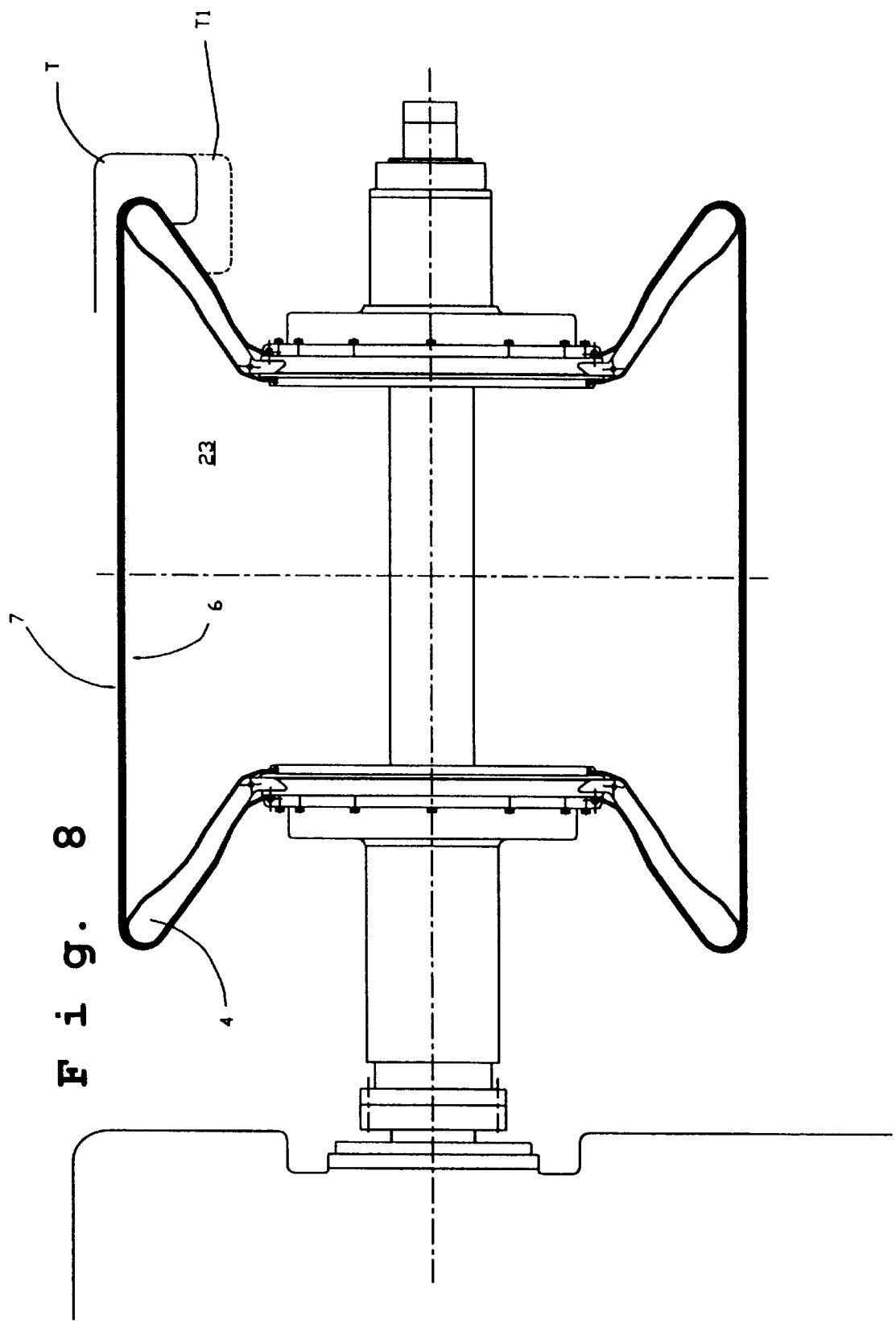

If necessary, one of the flanges 70 of the mantle 7 is then introduced as a stop on one side (see FIG. 6). This operation is optional, and has no other purpose than to provide a support for the mantle 7 which is strictly identical over the entire periphery defined by the heads 42 and the spring 43 of sub-assembly G.

One progressively inflates the interior chamber 23 delimited by sub-assemblies G and D and by membrane 6. This causes separation of the plates 3 (see FIG. 7) as far as the stop created by the adjustment screws 8 (see FIG. 8). Note that radial expansion of membrane 6 is impossible because it remains contained by mantle 7. On the other hand, axial stretching of mantle 7 as well as membrane 6 remains free: it suffices to conquer the elastic return of the rubber die constituting these elements. One understands here that the crossed reinforcement of the flanges 70 has the purpose of providing good holding of the flanges on each of the peripheral edge sections which the heads 41 comprise, covered by the sleeves 5 and the membrane 6.

One thus has a sufficiently firm reference surface and of sufficiently precise dimensions to be able to produce a tire. As an illustration, an inflation pressure of about 0.5 bars is entirely adequate. One therefore sees that the internal pressure does not reach a level which would risk being dangerous, considering the volume of the said interior chamber 23.

After building, the interior chamber 23 is deflated, which returns the plates 3 to a position close to that of FIG. 6. Then the sleeves 5 are returned to the atmospheric pressure, and the pistons 32 are made to return to their previous position. The drum returns to the configuration of FIG. 3.

In such a drum, with the relative axial position of the axes of articulation 40 of the rods 4 of each group unchanged, the pivoting of the said rods 4 from the building position toward the retracted position increases the distance between the heads 41 of the rod 4. However, the compactness of the mechanical parts is such that the plates can be tightly brought close to each other. The green tire can be removed from the drum, because the axial distance between the heads of the rod is sufficiently small and the maximum diameter of the drum has returned to a level lower than the diameter measured under the bead of the tire (seat diameter). If necessary, to facilitate this operation, a vacuum is created inside the chamber 23.

When the tire is removed from the drum, the mantle 7 generally remains inside the tire. It can then be extracted manually, in order to be used again for the next confection.

The drum illustrating the present invention only shows one particular application for it. The specialist will have understood that, for other applications, the drum could have a slightly different appearance, without straying from the scope of the present invention. Thus, for example, in the drum illustrated, the rods form an angle of about 45° relative to the axis of the central shaft. This arrangement however is not restrictive. One can add that, to cover the very large majority of applications that can be expected, in position of confection, the rods will form a predetermined angle between 45° and 90° relative to the axis of the central shaft, the head of each rod 4 being positioned relative to the said shaft at a distance greater than the distance between the axis of articulation and the said shaft.

Generally, one can note that, for the method of controlling the rods 4 requiring a lever 42 as described, the lever 42 is oriented relative to the rod 4 such that, when the lever 42 is positioned perpendicular to the axis of the said central shaft, the rod 4 forms the predetermined angle. In this variation, the means for controlling the pivoting of the rods 4 include basically, for each plate 3, two annular crowns, the first 30 fixed to the said plate, the second 31 axially mobile relative to the first, the crowns tightly holding the levers 4, each sleeve 5 being mounted on the crowns 30, 31.

Figure 9:
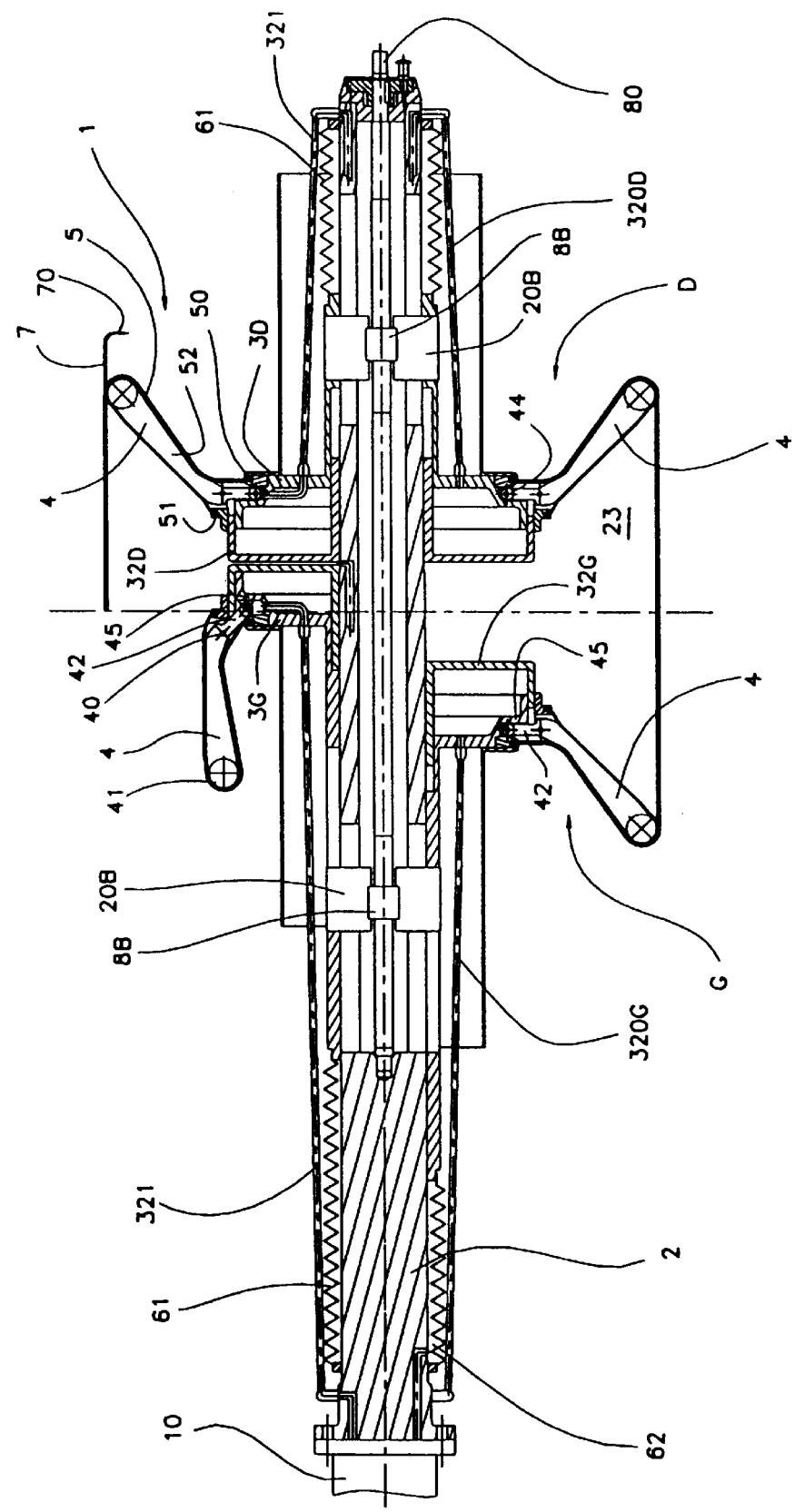
FIGS. 9 and 10 illustrate a variation of the drum of the present invention.
Figure 10:
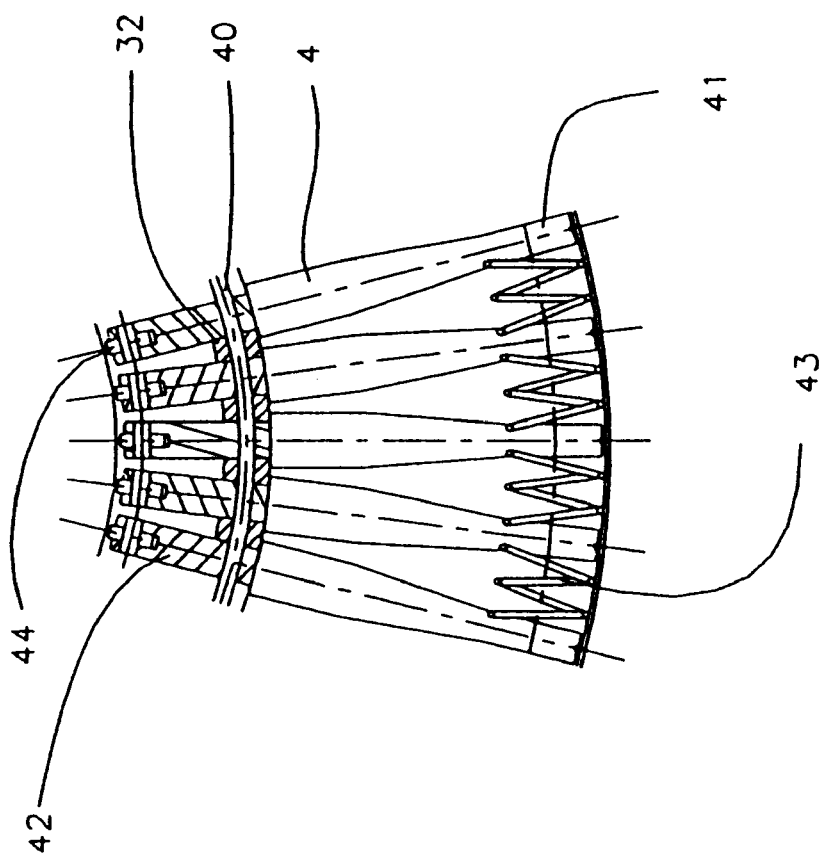

Another embodiment of the drum of the present invention is shown in FIGS. 9 and 10. This drum is distinguished from the previously described preferred embodiment in several points. One 3D of the plates is mounted fixed axially, only the plate 3G sliding axially during the fabrication cycle of a tire. Of course, adaptation of the drum to different widths of tires to be fabricated requires axial movement of plate 3D on the one hand, and of the stop limiting the sliding of plate 3G on the other hand. Pivoting of the rods 4 goes through a movement parallel to the axis of the drum of the axis of articulation 40 while the end of the corresponding lever 42 is kept fixed axially. Finally, the drum does not contain a membrane 6. All of these differences, which of course can be used together or separately, are explained below.

In FIG. 9 two screws 8B are shown mounted on a shaft 80 containing reverse-threaded areas. The locking keys 20B are fixed to these screws 8B. The locking keys 20B on the right immobilize the plate 3D not only from rotation (as done by the locking keys 20 of the previous versions), but also axially. The locking keys 20B on the left, inserted on plate 3G in a hole, immobilize the plate 3G from rotation, while leaving a degree of liberty of sliding. By acting on shaft 80, the relative distance of the screws 8B is adjusted, and there also, the maximum value of the relative distance between plates 3G and 3D is adjusted.

A roller 44 is mounted on the end of each lever 42. For each of the plates 3G and on 3D, the forks 45 receiving each roller 44 are mounted fixed to each plate 3G and 3D, and the axes of articulation 40 of the rods 4 are mounted on piston 32G or 32D respectively. Thus, the pivoting of the rods 4 is done by moving axially (that is, parallel to the axis of the drum) the axis of articulation 40 relative to the forks 45. The presence of roller 44 facilitates this movement. The air conduits 321 allow creating a vacuum in each sleeve 5, in order to push the sleeves against the rods 4 for the reason explained above. Finally, the air conduits 320g and 320d allow for the pistons 32G and 32D to be controlled separately for each of the plates 3G and 3D.

A bellows 61 covers the shaft of the drum at each of its ends, in direct extension from plates 3G and 3D. On the left side, the bellows 61 acts as a jack 62 allowing, when it is put in depression, to exert traction on plate 3G causing a relative separation between plates 3G and 3D, therefore between each of the groups of rods 4. This arrangement allows for membrane 6 to be eliminated, as will be understood from the explanation of operation below.

The operation of the drum designed according to the second variation is only described insofar as a variation of operation is proposed. In the absence of airtightness between the groups of rods 4, the initial separation (stage shown in FIG. 7 for the first variation) of the plates results here from the traction of the jack 62, at least as long as contact with another means of airtightness, like the mantle 7, is not provided. When the plates 3G and 3D are sufficiently separated so that the lateral flanges 70 of the mantle 7 are well-supported on the heads 41 of the rod, the drum then presents an airtight inner chamber 23. Continuing and/or remaining in the separated position is assured by putting this inside chamber 23 under pressure as explained for the first variation.

To remove the green tire from the drum, it is possible to manipulate the pivoting of the rods 4 toward the horizontal position in two successive stages and not simultaneously. We start by activating the piston 32G. In this way we first disengage the left bead. Next we activate the piston 32D, which permits removal of the green tire on the right side. This arrangement allows, at the given drum size, to remove wider green tires.

The drum according to the invention provides a precise building reference while being very compact. It particularly permits easily accommodating rolled-up membranes and/or bead positioning or bead filler devices on either side of the plates, because the space axially exterior to the levers 4 is free of any mechanical part. The proposed design can be adapted very easily to different situations. It is by selecting an appropriate arrangement of the predetermined angle and the length of the rods that the drum can be adapted to the type of tire which we want to produce. Such a drum can serve as a semi-hub drum in the initial phase, to make a green tire with a radial carcass. In this case, note as an example that the predetermined angle will generally reach a value close to 90°. The specialist will be able to easily design other modifications or adaptations, according to the precise application for which the drum is intended which he will design in light of the present invention.

We claim:

1. Drum for building a tire, having a central shaft mountable on a mandrel holder, comprised of:

two plates mounted at axially spaced positions and slidable on the central shaft relative to each other;

on each plate, a group of rods, each rod having on one side an axis of articulation and on the other side a head, the axis of articulation of each rod of a group being mounted on the respective plate in such a way that said axes of articulation are all included in the same plane perpendicular to the axis of said central shaft, and equidistant from said central shaft;

means for controlling the pivoting of said rods around their axis of articulation, between a retracted position and a building position, said building position of the rods in each of the plates being symmetrical from one plate to the other;

in each group, a sleeve covering all of the rods of said group, each sleeve being anchored on a respective plate so that the rods are enclosed in the sleeve and in such a way as to define, for said group, an airtight enclosure; and means to selectively connect each enclosure to a vacuum source.

2. Drum according to claim 1, in which, in retracted position, the rods are approximately parallel to the axis of the central shaft.

3. Drum according to claim 1, in which, in building position, the rods form a predetermined angle between 45° and 90° relative to the axis of the central shaft, the head of each rod being positioned relative to said shaft at a distance greater than the distance between the axis of articulation and said shaft.

4. Drum according to claim 3, in which, with the relative axial position of the axes of articulation of the rods of each group unchanged, the pivoting of said rods from the building position toward the retracted position decreases the distance between the heads of the rod.

5. Drum according to claim 1, further comprising an airtight membrane covering both groups of rods in an airtight manner and having means for establishing with the plates an airtight chamber enclosing the groups of rods and a pneumatic conduit communicating with the airtight chamber for conveying compressed air between said plates to cause the plates to slide on the central shaft and thereby to move away relative to each other.

6. Drum according to claim 5, in which said means for establishing airtightness comprises sleeves surrounding each of the groups of rods, the membrane being attached to each sleeve at approximately a location where each sleeve covers the heads of said rods.

7. Drum according to claim 5, further comprising a removable mantle forming a continuous ring covering said membrane, said mantel including lateral flanges curved toward a central shaft to cover at least slightly the heads of the rods, said mantle comprising a rubbery material reinforced by wires positioned at about zero degrees with respect to a plane perpendicular to the axis of the drum, whereby circumferential expansion of said mantel can be stopped a predetermined value.

8. Drum according to claim 1, containing means for providing elastic repulsion of said plates.

9. Drum according to claim 1, further comprising a spring mounted on all the heads of the rods to maintain continuity of a circumferential edge defined by the heads of the rods.

10. Drum according to claim 3, in which each rod includes on the side opposite the axis of articulation a lever fixed to said rod, said lever being oriented relative to said rod so that said lever is perpendicular to the axis of said central shaft when said rod is in the building position, and in which said means of control include, for each plate, two annular crowns, the first fixed to said plate, the second axially mobile relative to the first, the crowns holding tightly said levers, each sleeve being mounted on said crowns.

11. Drum according to claim 3, in which each rod includes on the side opposite the axis of articulation a lever fixed to said rod, said lever being oriented relative to said rod so that said lever is perpendicular to the axis of said central shaft when said rod is in the building position, and further including a roller mounted on the end of each lever and said means of controlling the pivoting of the rods includes, on each plate, a group of forks receiving each roller, movement of the plates being transmitted by the forks to the levers for pivoting of the rods.

12. Drum according to claim 5, wherein the membrane comprises an isotropic, rubbery, non-reinforced material.

13. A drum assembly for building components of a tire thereon comprising:

a mandrel having an axis;

first and second plates each axially slidable relative to and on the mandrel;

a first plurality of rods, each rod having a proximate end movably mounted on the first plate for movement about an individual rod axis and having a distal end spaced from its proximate end, the rods being distributed around the first plate such that the individual rod axes are at substantially the same radial spacing from the mandrel and lie in a first rod axis plane which is substantially perpendicular to the mandrel axis;

a second plurality of rods, each rod having a proximate end movably mounted on the second plate for movement about an individual rod axis and having a distal end spaced from its proximate end, the rods being distributed around the second plate such that the individual rod axes are at substantially the same radial spacing from the mandrel and lie in a second rod axis plane which is perpendicular to the mandrel axis; and means, operatively connected to the first and second pluralities of rods, for moving each rod about its individual rod axis between a retracted position in which the distal end of the rod is at a retracted radial spacing from the mandrel axis and a deployed position in which the distal end of the rod is at a deployed radial spacing from the mandrel axis greater than in the retracted position of the rod, whereby the drum assembly can be disposed in a smaller diameter disposition in which the first and second plates are in an axial adjacent position relative to one another and in which the rods are in their retracted positions and a larger diameter disposition in which the first and second plates are more axially spaced from one another than in their axial adjacent position and in which the rods are in their deployed positions;

sleeves covering the rods of each plate to thereby form a substantially airtight enclosure about each plurality of rods; and means for creating a vacuum in said enclosures.

14. Drum according to claim 13, in which, in retracted position, the rods are approximately parallel to the axis of the mandrel.

15. Drum according to claim 13, in which, in deployed condition, the rods form a predetermined angle between 45° and 90° relative to the axis of the mandrel, the distal end of each rod being positioned relative to said mandrel at a distance greater than the distance between the individual rod axis and said mandrel.

16. Drum according to claim 15, in which, with the relative axial position of the individual rod axes unchanged, movement of said rods from the deployed position toward the retracted position decreases the distance between the distal ends of the rods.

17. Drum according to claim 13, further comprising means for establishing an airtight chamber enclosing both plurality of rods around the plates and a pneumatic conduit for conveying compressed air to the airtight chamber to cause the axial separation of the plates relative to each other.

18. Drum according to claim 17, in which said means for establishing the airtight chamber comprises an isotropic, rubbery, non-reinforced membrane joined on both sides to each of the sleeves at approximately a location where the sleeves cover the distal ends of said rods.

19. Drum according to claim 18, further comprising a removable mantle forming a continuous ring covering said membrane, said mantle including lateral flanges curved toward the mandrel axis to cover at least slightly the distal ends of the rods, said mantle formed of a rubbery material reinforced by wires positioned at zero degrees relative to a plane perpendicular to the mandrel axis, whereby circumferential expansion of said mantle can be stopped at a predetermined value.

20. Drum according to claim 13, further comprising means for providing elastic repulsion of said plates.

21. Drum according to claim 13, further comprising a spring mounted on the distal ends of the rods to maintain the distal ends in circumferential relationship.

22. Drum according to claim 15, in which each rod includes on the side opposite the individual rod axis a lever fixed thereto, said lever being oriented relative to the respective rod so that said lever is perpendicular to the mandrel axis when said rod is in the deployed position, and in which said means for moving each rod include, for each plate, two annular crowns, the first fixed to said plate, the second axially mobile relative to the first, the crowns holding tightly said levers, each sleeve being mounted on said crowns.

23. Drum according to claim 15, in which each rod includes on the side opposite the individual rod axis a lever fixed thereto, said lever being oriented relative to the respective rod so that said lever is perpendicular to the mandrel axis when said rod is in the deployed position, and further including a roller mounted on the end of each lever and said means of moving the rods includes, on each plate, a group of forks receiving each roller, movement of the plates being transmitted by the forks to the levers for movement of the rods.

* * * * *